(12) United States Patent
Knoblauch et al.

(10) Patent No.: US 9,102,233 B2
(45) Date of Patent: Aug. 11, 2015

(54) DRIVETRAIN OF A PURELY ELECTRICALLY DRIVEABLE MOTOR VEHICLE

(71) Applicant: Dr. Ing. h.c. F. Porsche Aktiengesellschaft, Stuttgart (DE)

(72) Inventors: Daniel Knoblauch, Obergruppenbach (DE); Martin Fuechtner, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/379,108

(22) PCT Filed: Feb. 7, 2013

(86) PCT No.: PCT/EP2013/000367
§ 371 (c)(1),
(2) Date: Aug. 15, 2014

(87) PCT Pub. No.: WO2013/120594
PCT Pub. Date: Aug. 22, 2013

(65) Prior Publication Data
US 2015/0021109 A1    Jan. 22, 2015

(30) Foreign Application Priority Data
Feb. 15, 2012 (DE) .......................... 10 2012 101 209

(51) Int. Cl.
*B60K 1/00* (2006.01)
*B60K 17/16* (2006.01)
(Continued)

(52) U.S. Cl.
CPC ................ *B60K 17/165* (2013.01); *B60K 1/02* (2013.01); *B60K 17/12* (2013.01); *B60K 17/16* (2013.01); *F16H 48/10* (2013.01); *B60K 2001/001* (2013.01)

(58) Field of Classification Search
USPC ................................................. 180/65.1–65.6
See application file for complete search history.

(56) References Cited

U.S. PATENT DOCUMENTS 6,125,953 A * 10/2000 Arai et al. ..................... 180/6.28
7,140,461 B2 * 11/2006 Morrow .................. 180/65.245
(Continued)

FOREIGN PATENT DOCUMENTS

DE    10 2009 056 366    6/2011
DE    10 2009 059 903    6/2011
(Continued)

OTHER PUBLICATIONS

German Search Report dated Oct. 8, 2012.
(Continued)

*Primary Examiner* — John Walters
*Assistant Examiner* — James Triggs
(74) *Attorney, Agent, or Firm* — Gerald E. Hespos; Michael J. Porco; Matthew T. Hespos

(57) ABSTRACT

A drive train (2) of a purely electrically drivable motor vehicle has at least one electric machine (13, 14), a transmission (21), a planetary differential (22) and a drivable axle (2). The axle (2) can be driven by the electric machine (13, 14) via the transmission (21) and the differential (22). The planetary differential (22) has an input (32, 33) connected to the electric machine (13, 14), a first output (28, 34, 35, 36, 37, 38) connected to a first section (4) of the drivable axle (2), and a second output (30, 31, 42) connected to a second section (5) of the drivable axle (2). Rotational axes of the input and outputs of the planetary differential (22) form an intermediate axis (53) arranged between an axle (15) of a rotor (17) of the electric machine (13, 14) and the drivable axle (2).

15 Claims, 3 Drawing Sheets

(51) Int. Cl.
   *B60K 1/02*   (2006.01)
   *B60K 17/12*  (2006.01)
   *F16H 48/10*  (2012.01)

(56) References Cited

U.S. PATENT DOCUMENTS

2002/0074177 A1* 6/2002 Pasquini et al. ............... 180/233
2009/0038866 A1* 2/2009 Abe et al. ..................... 180/65.7
2011/0039650 A1* 2/2011 Rosemeier et al. ........... 475/149

FOREIGN PATENT DOCUMENTS

EP  2116412     11/2009
JP  2008-215519  9/2008

OTHER PUBLICATIONS

International Search Report dated Jun. 18, 2013.

* cited by examiner

DRIVETRAIN OF A PURELY ELECTRICALLY DRIVEABLE MOTOR VEHICLE

CROSS REFERENCE TO RELATED APPLICATION

This application is the US national phase of PCT/EP2013/000367, filed on Feb. 7, 2013, which claims priority under 35 USC 119 to German Patent Appl. No. 10 2012 101 209.1 filed on Feb. 15, 2012, the entire disclosures of which are incorporated herein by reference.

BACKGROUND

1. Field of the Invention

The invention relates to a drivetrain of a purely electrically driveable motor vehicle, having an axle which has a differential, and having at least one electric machine, wherein the first axle can be driven by means of the at least one electric machine via a transmission.

2. Description of the Related Art

A drivetrain of said type, which is used for an electrically driveable earth-moving vehicle or for an agricultural vehicle with four-wheel drive, is known from DE 600 13 340 T2. Said drivetrain has two electric machines which, as viewed in the direction of travel, are arranged above one axle, the rear axle, and which interact with a spur gearing which is arranged in front of the rear axle. The transmission is connected via one shaft or two shafts to differentials which are assigned to the two axles, that is to say to the rear axle and to the front axle.

It is an object of the present invention to provide a drivetrain for a motor vehicle which is intended to be operated purely electrically, by means of which drivetrain driving is possible in different driving states with particularly good efficiency.

SUMMARY OF THE INVENTION

The drivetrain of the purely electrically driveable motor vehicle thus has a differential which is in the form of a planetary-type differential. Here, the planetary-type differential has an input, which is connected to the at least one electric machine, and two outputs. One output, hereinafter referred to as first output, is connected to one of the axle sections, hereinafter referred to as first section, and the other, second output is connected to another, second axle section of the axle. The common axes of rotation of input and outputs of the planetary-type differential form an intermediate axis which is arranged between the axis of a rotor of the at least one electric machine and the first axle.

Accordingly, the planetary-type differential is assigned to the intermediate axis which is arranged between the axis of the electric machine and that of the wheels, and thus of the axle assigned to the road wheels of the motor vehicle.

This configuration of the drivetrain makes it possible for the torque introduced into the planetary gear set by means of the at least one electric machine to be distributed between the two axle sections of the axle, and moreover, with simple structural enhancement of the drivetrain based on this configuration, for an additional torque vectoring function to be realized.

The planetary gear set is preferably configured such that the input has an outer internal gear of the planetary gear set, one output has a sun gear of the planetary gear set, and the other output has a planet gear carrier with at least one planet gear of the planetary gear set. In general, the planet gear carrier rotatably holds multiple, for example three, planet gears, which mesh with the internal gear and with the sun gear. The described configuration permits a particularly simple design of the drivetrain, to the effect that, by means of the at least one electric machine, the torque can be introduced into the planetary differential, specifically the internal gear, radially from the outside, and said torque is then distributed to the radially inner components of the planetary differential, in the present case the planet gear carrier, with the at least one planet gear, and the sun gear.

The drivetrain is in particular structurally configured such that the at least one electric machine has a drive output shaft which is connected to the rotor of the electric machine, wherein the drive output shaft is connected rotationally conjointly to a first pinion of the transmission, which first pinion meshes with a first spur gear of the transmission, wherein the first spur gear is connected to the internal gear of the planetary gear set.

It is considered to be particularly advantageous if the drivetrain has two electric machines, wherein one electric machine is coupled permanently to the transmission, and the other electric machine can be decoupled from said transmission by means of a first, switchable clutch or a freewheel. Accordingly, the transmission and thus the planetary-type differential can be operated with one electric machine or with two electric machines. This capability for one electric machine to be decoupled makes it possible for different driving states to be managed in optimum fashion. Accordingly, the axle is driven only by means of one electric machine in particular when it is not sought for said axle to be driven with maximum torque or maximum power. If, by contrast, it is desired for said axle to be driven with maximum torque or maximum power, the second electric machine is activated. In this way, the drivetrain can be operated at optimum efficiency by virtue of other only one electric machine or both electric machines interacting with the axle.

When an electric machine is decoupled, it can then be deactivated. If a freewheel is used, one electric machine ceases to be effective when it is overtaken, so to speak, by the other electric machine owing to the latter running at a higher rotational speed, thus activating the freewheel.

The clutch may act in a positively locking or non-positively locking manner. If the clutch acts in a positively locking manner, it can only be switched in the presence of a relatively low rotational speed difference, whereas in the case of a clutch that acts in a non-positively locking manner, said clutch can be switched with slip, that is to say in the presence of relatively large rotational speed differences between drive output shaft of the electric machine and input shaft of the transmission.

In one particular refinement of the invention, the drivetrain is modified such that the decouplable electric machine has a drive output shaft which is connected rotationally conjointly to the rotor of said electric machine, wherein said drive output shaft is connected rotationally conjointly to a second pinion of the transmission, which second pinion meshes with a second spur gear of the transmission. Said spur gear can be connected in torque-transmitting fashion by means of a second, switchable clutch to the first output of the planetary gear set and/or to the first axle section and/or by means of a third, switchable clutch to the second output and/or to the second axle section.

If one electric machine, which is not decouplable, is in operation and is thus exerting load on the planetary-type differential, it is possible, by coupling the other, decouplable electric machine, and depending on which of the two clutches—second or third clutch—is actuated, for a torque flow to be realized said electric machine via the transmission strand to one or to the other axle section of the axle, or else by all means to both axle sections simultaneously. On the other hand, said mode of operation is also possible when the non-decouplable electric machine is not in operation and the two electric machines are not interacting in torque-transmitting fashion owing to the freewheeling of the freewheel or owing to the open clutch.

Said configuration of the drivetrain with the two electric machines and the transmission assigned thereto and the clutches makes it possible either for the two axle sections of the axle to be driven only by the first electric machine via the transmission assigned thereto and via the planetary-type differential assigned thereto, or, if the second electric machine is used, for the drive power to be conducted past the planetary differential and, instead, for each axle section to be driven directly by means of the second electric machine by switching the second and third clutches. Said independent drive of the respective axle section of the axle allows the motor vehicle wheel, that is to say road wheel of the vehicle, assigned to the respective axle section to be driven independently. Torque vectoring of the axle sections of the axle or of the wheels of the axle is thus possible. Said torque vectoring does not entail any losses owing to braking intervention on the axle section of one or the other wheel.

As described, the introduction of the torque for the purposes of torque vectoring by means of the second electric machine can be superposed on the introduction of a drive torque by means of the first electric machine by way of the planetary gear set. In this case, the first clutch between the first and second electric machines is open, or the freewheel is active. A torque capacity is required in the freewheel, and a rotational speed difference is required at the freewheel.

The drive of the motor vehicle only by means of one electric machine—the first electric machine—is advantageous if driving states are to be managed in which low energy consumption is of importance. The second electric machine is activated in particular if a maximum torque or a maximum power is to be made available, said second electric machine exerting load, together with the first electric machine, on the planetary-type differential. By contrast, if driving states which are critical from a driving dynamics aspect are to be managed, a switch is made to the configuration with independent wheel drive by virtue of the freewheel being activated or the first clutch being transferred into its open position, such that the second electric machine can then, by virtue of the second and/or third clutch being closed, impart a desired torque to the axle sections of the axle independently without said torque being introduced by the second electric machine into the axle section(s) via the planetary gear set.

It is preferable for the two electric machines and the three clutches to have control means by which said components can be placed in the above-described functional states.

To minimize the structural space of the drivetrain in the region of the electric machine or electrical machines, transmission, planetary-type differential and axle, it is considered to be particularly advantageous if the second and the third clutch are arranged on the same side of the planetary gear set and adjacent to one another. Accordingly, all of the sensors and actuators for said two clutches can be arranged in a compact manner, and moreover, relatively little structural space is required for said two clutches. It is basically likewise conceivable for the second and the third clutch to be arranged on opposite sides of the planetary gear set. In this case, it would also be necessary for the sensors and actuators of the clutches to be located on both sides of the planetary gear set, with the result that a larger structural space would be required in terms of the width extent of the drivetrain.

In a state in which both the second clutch and also the third clutch are closed, the differential would have the function of a locking differential. Said switching state of the clutches would thus yield an axle-differential lock.

In particular, the transmission strands between the two electric machines and the axle sections have constant transmission ratios.

In terms of construction, the drivetrain is in particular designed, in the region of the planetary gear set, such that the respective output has a gearwheel which is connected to a planet gear carrier for the at least one planet gear and to the sun gear respectively, wherein the gearwheel meshes with a gearwheel which is connected rotationally conjointly respectively to the first or second axle section.

The space requirement of the drivetrain in the region of the two electric machines, of the transmission, of the planetary-type differential and of the axles can be greatly optimized by virtue of the bearings being designed substantially as needle-roller bearings. In particular, the axle sections and/or the internal gear and/or the sun gear and/or the planet gear carrier for the at least one planet gear are/is mounted by means of needle-roller bearings.

It is also considered to be particularly advantageous if the two axle sections are mounted one inside the other.

The components of transmission and planetary-type differential are formed in particular as a spur gears. These can be accommodated in a relatively small structural space.

The electric machines are in particular arranged transversely with respect to the direction of travel of the motor vehicle.

The drivetrain is preferably used in a motor vehicle designed as a passenger motor vehicle. Said passenger motor vehicle is in particular a sports car. Said motor vehicle, in particular passenger motor vehicle or the sports car, is preferably of rear-wheel-drive configuration. The at least one electric machine, in particular both electric machines, are thus arranged in the rear region of the motor vehicle or drivetrain. It is considered to be particularly advantageous for the two electric machines to be arranged behind the rear axle.

The motor vehicle may however basically also be of front-wheel-drive configuration.

The wheels assigned to the drivetrain are in particular mounted in an independent suspension configuration by means of articulated shafts. The drivetrain thus does not have a rigid axle.

Further features of the invention will emerge from the subclaims, from the appended drawing and from the description of multiple preferred exemplary embodiments which are depicted in the drawing, without the invention being restricted to said exemplary embodiments.

DETAILED DESCRIPTION

Figure 1:
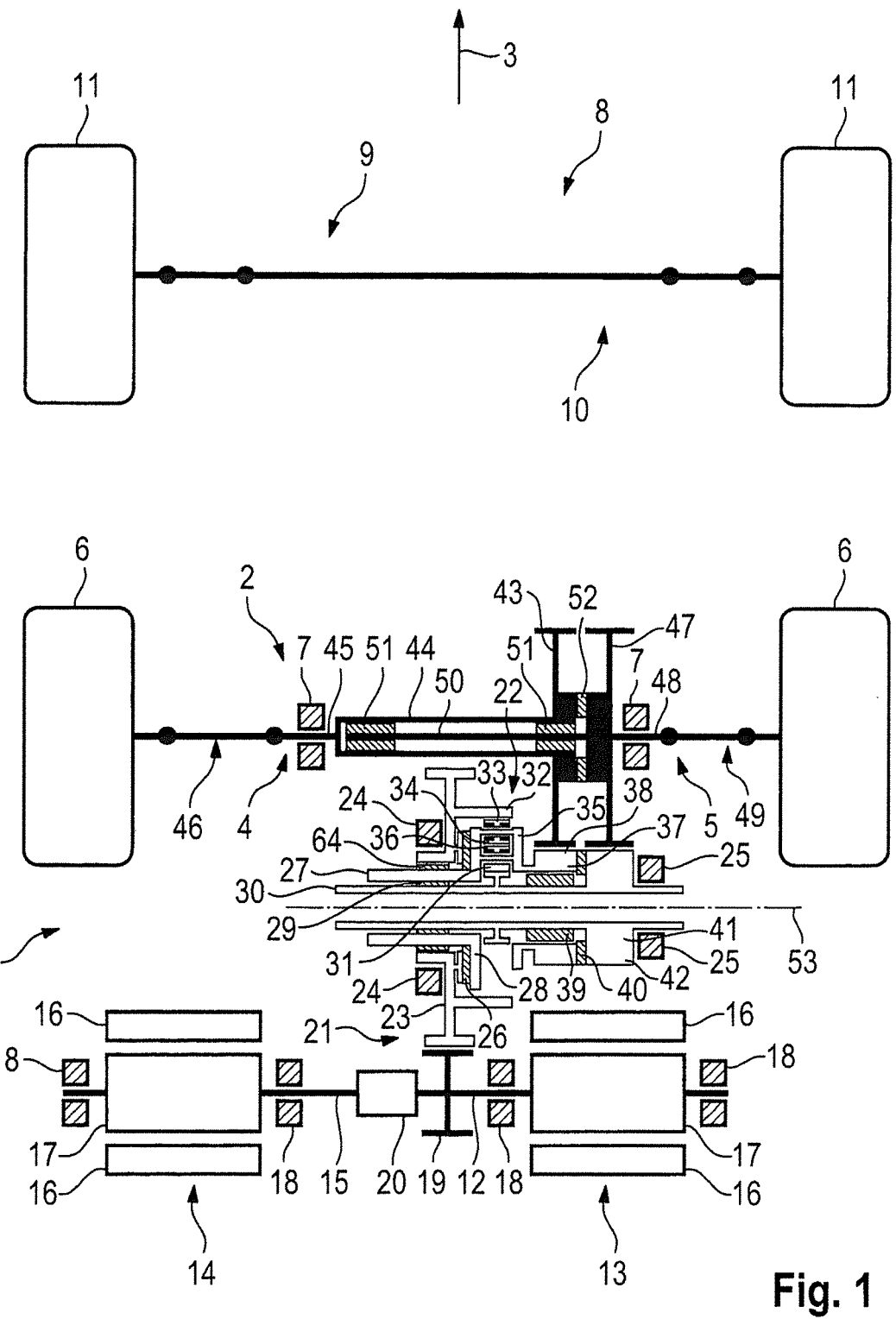
FIG. 1 is a diagrammatic illustration of a first preferred embodiment of the drivetrain according to the invention.

The exemplary embodiment of FIG. 1 illustrates a drivetrain for a purely electrically driveable motor vehicle, which is in particular a passenger motor vehicle, specifically a sports car. The figure shows the drivetrain assigned to the rear axle of the motor vehicle, and also a non-driven front axle of the motor vehicle.

The drivetrain 1 with independent wheel suspension has the first, rear axle 2. As viewed in relation to the forward direction of travel 3 of the motor vehicle, hereinafter referred to as direction of travel, the rear axle 2 has a left-hand axle section 4 and a right-hand axle section 5. The reference numeral 6 is used to denote the left-hand wheel and the right-hand wheel of the rear axle 2, and the reference numeral 7 is used to denote bearings for the axle sections 4 and 5 of the rear axle 2. The axle sections 4 and 5 of the rear axle 2 have articulated shafts.

The motor vehicle also has a second, front axle 8 which is not driven. Said axle 8 also has independent wheel suspension. The front axle 8 has a left-hand axle section 9 and a right-hand axle section 10. The reference numeral 11 is used to denote the left-hand wheel and the right-hand wheel of the front axle 8, and the reference numeral 12 is used to denote the bearings for the axle sections 9 and 10 of the front axle 8. The axle sections 9 and 10 of the front axle 8 likewise have articulated shafts.

The rear axle 2 can be driven by means of two electric machines 13 and 14. Either only the left-hand electric machine 13 is in operation, or both electric machines 13 and 14 are in operation. In certain driving states, only the left-hand electric machine 14 is in operation.

The two electric machines 13 and 14 are arranged behind the rear axle 2 and transversely with respect to the direction of travel 3. The axis of rotation of the respective electric machine 13 and 14, illustrated by way of the drive output shaft 15 thereof, is thus arranged transversely with respect to the direction of travel 3, wherein the axes of rotation of the electric machines coincide.

The stator of the respective electric machine 13 or 14 is denoted by the reference numeral 16, and the rotor of the respective electric machine 13 or 14, to which the drive output shaft 15 is connected, is denoted by the reference numeral 16. The respective drive output shaft 15 is mounted in bearings 18.

The drive output shaft 15 of the electric machine 13 is rotationally conjointly connected, on its side facing toward the electric machine 14, to a pinion 19. The drive output shaft 15 of the other electric machine 14 is connected to the pinion 19 via a freewheel or a switchable clutch 20.

Between the axle 2 and an axis assigned to the two electric machines 13 and 14, said axis being defined substantially by the drive output shafts 15 of the electric machine, there is located a functional arrangement formed substantially by a transmission 21 and a planetary-type differential 22. Said arrangement is likewise arranged behind the rear axle 2. The transmission 21 has the pinion 19 and a spur gear 23 that meshes with said pinion. Said spur gear is mounted in a bearing 24 of a housing half that is not illustrated, wherein the housing that is not illustrated serves for accommodating the components assigned to the intermediate axis, which components will be described in more detail below and are arranged between the rear axle 2 and the electric machines 13 and 14. The other housing half, which is likewise not illustrated, accommodates a bearing 25. All of the bearings that will be described in more detail below are needle-roller bearings, which thus require only a relatively small structural space.

A hollow shaft 27 is mounted radially inside the spur gear 23 by means of a bearing 25, wherein said hollow shaft 27 forms a structural unit with a radially extending flange 28, said structural unit being mounted in the spur gear 23 by means of an axially acting bearing 26. A further hollow shaft 30 is mounted radially inside the hollow shaft 27 by means of a bearing 29. A sun gear 31 of the planetary-type differential 22 is held rotationally conjointly on said further hollow shaft in a central region. The spur gear 23 forms a structural unit with an axially extending annular collar 32 which is connected radially at the inside to an internal gear 33 of the planetary-type differential 22. Three planet gears 34 of the planetary-type differential 22, of which only one planet gear 34 is visible, mesh with the internal gear 33 and with the sun gear 31. The planet gears 34 are mounted in a planet gear carrier which is formed by the flange 28, by a flange 35 arranged parallel to the former flange, and by journals 36 that connect said flanges 28, 35, wherein the respective journal 36 rotatably holds a planet gear 34. The radially extending flange 35 is connected to a hollow shaft 37, which is equipped, radially on the outside, with a spur toothing 38. Accordingly, the hollow shaft 27, the flange 28, the three journals 36, the flange 35, the hollow shaft 37 and the spur toothing 38 form one component. Radially at the inside, said component is mounted, in the region of the hollow shaft 27, by means of the said bearing 29 and, in the region of the hollow shaft 37, by means of a bearing 39 in the hollow shaft 30. In the region of the hollow shaft 37, the component is supported axially via a bearing 40 on a radially outwardly extending annular collar 41 which forms a structural unit with the hollow shaft 30 and which is equipped, radially on the outside, with a spur toothing 42. The pitch circle and number of teeth of the spur toothing 38 correspond to those of the spur toothing 42.

A spur gear 43 meshes with the hollow shaft 37 which has the spur toothing 38, and thus with that region of the planetary-type differential 22 which has the planet gears 34, said spur gear forming a structural unit with a hollow shaft 44 which is connected, in the region of the end facing away from the spur gear 43, to an articulated shaft 46 of the axle 2. Hollow shaft 43, connecting part 45 and articulated shaft 46 form the left-hand axle section 4. The connecting part 45 is mounted in the bearing 7.

A spur gear 47, which has the same pitch circle and the same number of teeth as the spur gear 43, meshes with the spur toothing 38 of the hollow shaft 37 that is assigned to the sun gear 31 of the planetary-type differential 22. Said spur gear 47 is connected, on its side facing away from the spur gear 43, to a connection part 48 which is mounted in the bearing 7 and which is connected to an articulated shaft 49 for the right-hand rear wheel 6. On the side facing toward the spur gear 43, the spur gear 47 is equipped with a bearing rod 50 which extends over almost the entire length of the hollow shaft 44. The bearing rod 50 serves, by means of two bearings 51 arranged with a relatively large spacing to one another, for the radial mounting of the spur gear 47 in the hollow shaft 44 assigned to the spur gear 43. A bearing 52 serves for the axial mounting of the spur gear 47 in the spur gear 43.

The articulated shaft 49, the connection part 48 and the bearing rod 50 form the right-hand axle section 5.

The figure thus shows a drivetrain 1 having the driveable rear axle 2 and having the differential in the form of the planetary-type differential 22, having the two electric machines 13 and 14, and having the transmission 21 for the drive of the first, rear axle 2 by means of one or both electric machines 13, 14. The planetary-type differential 22 has an input via the annular collar 32, a first output via the hollow shaft 37 assigned to the planet gears 34, and a second output via the hollow shaft 30 assigned to the sun gear 31. The common axis of rotation of the input and outputs of the planetary-type differential 22 constitutes an intermediate axis, denoted by the reference numeral 53, between the rear axle 2 and the axis formed by the drive shafts 15 of the electric machines 13 and 14.

The mode of operation of the drivetrain 1 as per FIG. 1, as described up to this point, is as follows:

With the freewheel 20 in the freewheeling state or the clutch 20 open, only the electric machine 13 is operated, in particular if driving in a mode with low fuel consumption is sought. This situation can be referred to as part-load operation, in which it is thus not necessary for a maximum torque or maximum power to be made available at the first, rear axle 2.

In the case of operation by means of only the electric machine 13, the drive output torque of the electric machine is introduced, via the drive output shaft 15 thereof and via the pinion 19, into the spur gear 23, such that, with regard to the planetary-type differential 22, the internal gear 33 thereof correspondingly co-rotates because it forms a structural unit with the spur gear 23. Owing to the rotational movement of the internal gear 33, the planet gears 34 roll on said internal gear, and the sun gear 31 rolls on the planet gears 34. This has the effect that, by way of the planet gears 34, the hollow shaft 37 with spur toothing 38 is set in rotational motion, and at the same time, the hollow shaft 30 with annular collar 41 and spur toothing 42 is also set in rotation. Owing to the rotation thereof, the spur gears 43 and 47 rotate, whereby the wheels 6 are driven. In a known way, the differential or planetary-type differential 22 permits differential compensation between the two wheels 6 of the rear axle 2.

If a higher torque or a higher power, in particular a maximum torque or maximum power, is to be made available at the rear axis 2, the other electric machine 14 is activated in addition to the electric machine 13. When a defined rotational speed of the electric machine 14 relative to the rotational speed of the electric machine 13 is reached, the freewheel is deactivated, or the clutch 20 is closed, in order to connect the electric machine 14 to the pinion 19 in torque-transmitting fashion. A higher torque thus acts at the pinion 19, and accordingly, said higher torque is fed via the planetary gear set 22 to the axle sections 4 and 5 of the rear axle 2. A higher level of power thus also acts at the axle sections 4 and 5.

Figure 2:
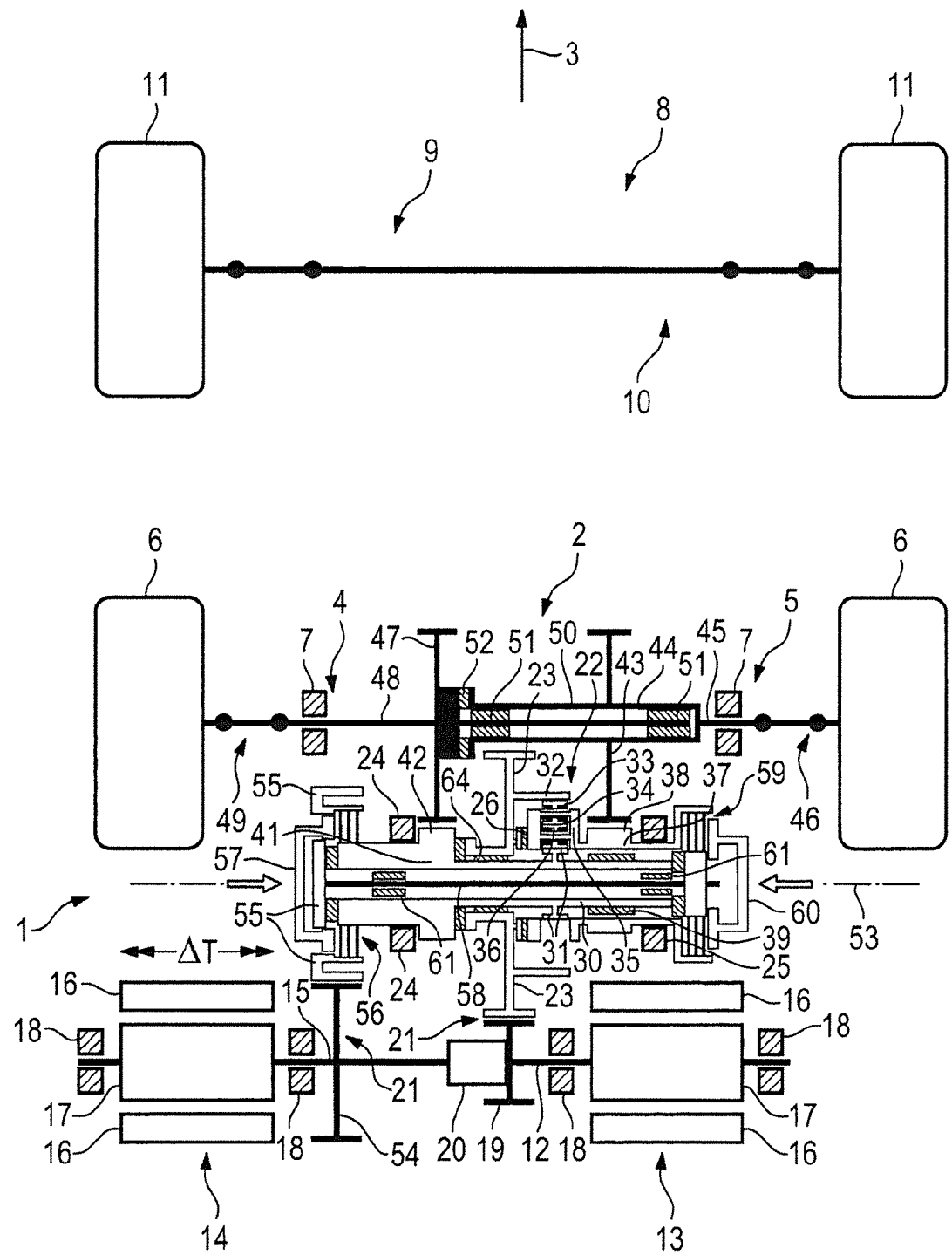
FIG. 2 is a diagrammatic illustration of a second preferred embodiment of the drivetrain according to the invention.

The embodiment of FIG. 2 differs from that of FIG. 1 in that the electric machine 14 can be placed into a state of interaction with components on the intermediate axis 53 independently of the electric machine 13, and torque vectoring can be realized by means of additional clutches. For simplicity, in the embodiment according to FIG. 2, components which correspond in terms of their construction or function to those in the embodiment of FIG. 1 have been denoted using the same reference signs.

In the embodiment of FIG. 2, a pinion 54 is connected rotationally conjointly to the drive output shaft 15 of the left-hand electric machine 13 upstream of the freewheel or the switchable clutch 20, which pinion 54 has a considerably larger pitch circle than the pinion 19. Said pinion 54 meshes with a spur gear 55 which, by means of a multiplate clutch 56 that can be actuated by means of an actuating device 57, can be placed in torque-transmitting connection with the annular collar 41 which is assigned to the sun gear 51 and which is of elongated form and which has the spur toothing 42. Said annular collar 41 is, by contrast to the embodiment as per FIG. 1, arranged at that side of the intermediate axis 53 which faces toward the electric machine 14. By virtue of the multiplate clutch 56 being closed, the rotational movement of the spur gear 55 is thus transmitted to the annular collar 41 and thus to the spur toothing 42 thereof, and from there to the spur gear 47 in order to drive the left-hand axle section 4.

Via a shaft 58 that extends through the hollow shaft 30, the spur gear 55 drives one clutch half of a multiplate clutch 59 which is assigned an actuating device 60. When the multiplate clutch 59 is closed, the rotational movement of the shaft 58 is transmitted to the hollow shaft 37, which has the spur toothing 38, and from there to the spur gear 43, by means of which the right-hand axle section 5 is driven.

When the electric machine 14 is decoupled, in particular when the electric machine 14 is at a standstill and the freewheel is activated or the clutch 20 is situated in the open position, the rear axle 2 is driven exclusively by means of the electric machine 13. This takes place, basically in the manner described with regard to FIG. 1, via the transmission 21 and the planetary-type differential 22. In this operating state, the two multiplate clutches 56 and 59 are open.

To drive the rear axle 2 with higher torque or to increase the power of the drive, the electric machine 14 is, with the multiplate clutches 56 and 59 open as before, set in operation and the freewheel is bypassed or the clutch 20 is closed. Accordingly, the additional torque or the additional power is introduced into the rear axle 2, in the manner described with regard to the embodiment of FIG. 1, via the pinion 18 of the transmission 21 and via the planetary-type differential 22.

With the clutch 20 open, or in the freewheeling functional state, driving in the torque vectoring mode is possible, this in particular taking place with the electric machine 13 continuing to be operated. The other electric machine 14 is energized, whereby the latter drives the spur gear 55 via the pinion 54. If the multiplate clutch 56 is closed by means of the actuating device 57, an additional torque is transmitted via the spur gear 47 into the left-hand axle section 4 owing to an additional torque being introduced into the annular collar 41 with the spur toothing 42 by means of the multiplate clutch 56. If the multiplate clutch 56 is open but, by contrast, the multiplate clutch 59 is closed, the additional torque is introduced from the spur gear 55, via the shaft 58 and the multiplate clutch 59, into the hollow shaft 37 with spur toothing 38, and from there via the spur gear 43 into the right-hand axle section 5. Here, a torque capacity, or a rotational speed difference between the drive output shafts of the two electric machines 13, 14, is required in the freewheel. If both multiplate clutches 56 and 59 are closed, the differential 22 acts as an axle-differential lock. It would basically also be possible for the drivetrain 1 to be driven only by means of the electric machine 14. ΔT indicates that, by means of the torque vectoring, different torques can be applied to the axle sections 4 and 5.

In the embodiment of FIG. 2, the multiplate clutches 56 and 59 are arranged on opposite sides of the transmission 21 and planetary-type differential 22. In this case, it is necessary for actuators and sensors to be provided in the region of each multiplate clutch, and thus in different regions. This entails greater outlay from a structural aspect and control aspect.

Figure 3:
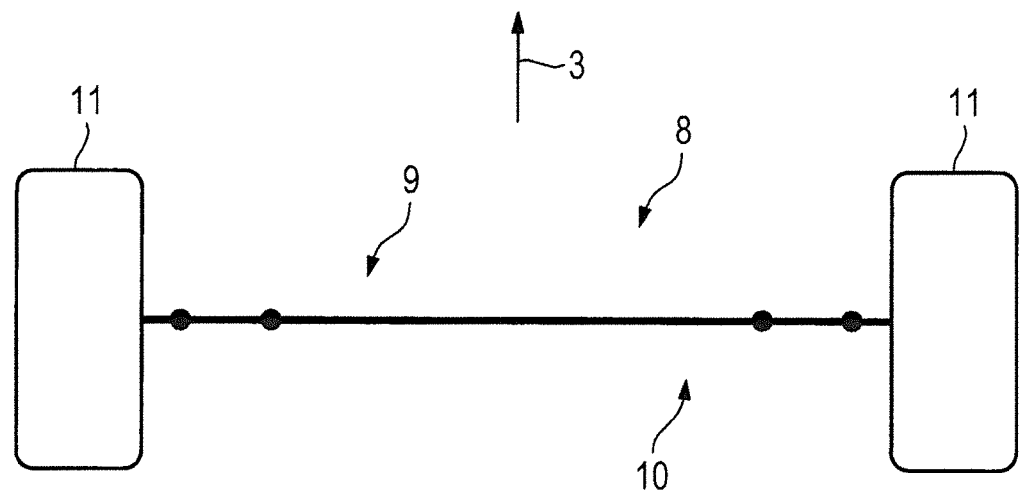
FIG. 3 is a diagrammatic illustration of a third preferred embodiment of the drivetrain according to the invention.
Figure 3:
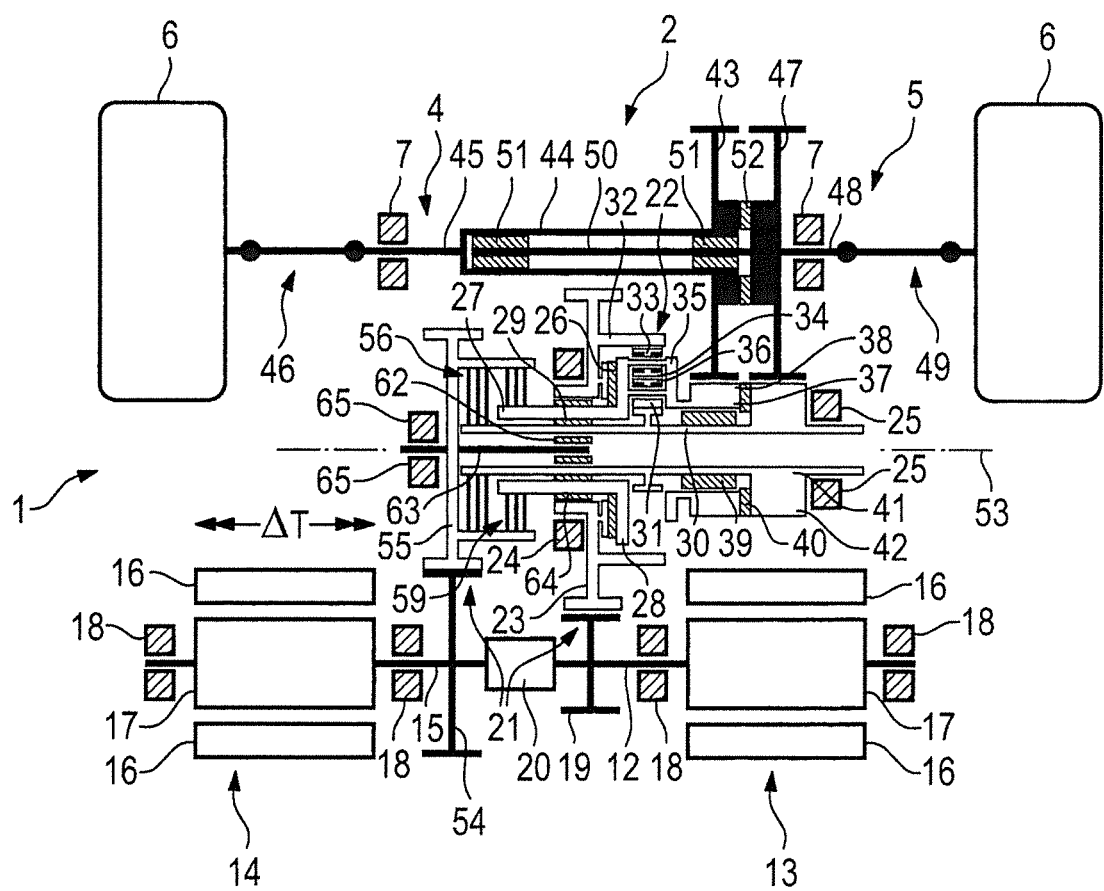

FIG. 3 shows a modification of the embodiment of FIG. 2, which is more compact by virtue of the two multiplate clutches 56 and 59 being arranged adjacent to one another. For simplicity, in the embodiment as per FIG. 3, components which correspond in terms of their construction or in terms of their function to those in the embodiment of FIG. 1 or FIG. 2 are denoted by the same reference signs.

In the embodiment of FIG. 3, the shaft 58 is mounted by means of bearings 61 in the hollow shaft 30 which has the sun gear 31.

The hollow shaft 30 is mounted by means of a bearing 62 in a bearing rod 63 which, in the region of its end facing away from the bearing 62, is mounted in the bearing 24. In the embodiment as per FIG. 3, not only is the multiplate clutch 56 arranged adjacent to the spur gear 55, but the multiplate clutch 59 is also mounted in the spur gear 55. Accordingly, the torque flow when the multiplate clutch is closed runs directly from the spur gear 55 into the hollow shaft 30 and/or into the hollow shaft 27. A shaft 58 for transmitting a torque, such as is provided in the embodiment as per FIG. 2, is not required in the embodiment of FIG. 3.

The invention claimed is:

1. A drivetrain of a purely electrically driveable motor vehicle, having at least one electric machine, a transmission, a planetary-type differential and an axle, wherein the axle is driven by the at least one electric machine via the transmission and the differential, the planetary-type differential having an input connected to the at least one electric machine and first and second outputs, the first output being connected to a first axle section of the axle and the second output being connected to a second axle section of the axle, wherein the axes of rotation of input and the outputs of a planetary gear set of the differential form an intermediate axis arranged between an axis of a rotor of the at least one electric machine and the axle.

2. The drivetrain of claim 1, wherein the input has an outer internal gear of the planetary gear set, the second output has a sun gear of the planetary gear set, and the first output has a planet gear carrier with at least one planet gear of the planetary gear set.

3. The drivetrain of claim 2, wherein the at least one electric machine has a drive output shaft that is connected to the rotor of the electric machine, the drive output shaft being connected rotationally conjointly to a first pinion of the transmission, the first pinion meshing with a first spur gear of the transmission, and the first spur gear being connected to the internal gear of the planetary gear set.

4. The drivetrain of claim 1, wherein the at least one electric machine comprises first and second electric machines, the first electric machine being coupled permanently to the transmission, and a first switchable clutch or a freewheel between the second electric machine and the transmission for selectively decoupling the second electric machine from the transmission.

5. The drivetrain of claim 4, wherein the second electric machine has a drive output shaft that is connected rotationally conjointly to the rotor of said the second electric machine, the drive output shaft being connected rotationally conjointly to a second pinion of the transmission, the second pinion meshing with a second spur gear of the transmission, the spur gear being connectable in a torque-transmitting fashion by a second switchable clutch to at least one of the first output of the planetary gear set the first axle section, the second axle section, and the second output by means of a third switchable clutch.

6. The drivetrain of claim 5, wherein the second and the third clutches are arranged on the same side of the planetary gear set and adjacent to one another, or on opposite sides of the planetary gear set.

7. The drivetrain of claim 2, wherein the respective output has a gearwheel connected to the sun gear and to the planet gear carrier for the at least one planet gear respectively, the gearwheel meshing with a gearwheel that is connected rotationally conjointly respectively to one of the other axle sections.

8. The drivetrain of claim 1, wherein the two axle sections are mounted one inside the other.

9. The drivetrain of claim 2, wherein at least one of the axle sections, the internal gear, the sun gear and a planet gear carrier for the at least one planet gear is mounted by needle-roller bearings.

10. The drivetrain of claim 1, wherein the axle is a rear axle of the motor vehicle.

11. The drivetrain of claim 10, wherein the at least one electric machine is behind the rear axle.

12. The drivetrain of claim 1, wherein the drivetrain is a drivetrain of a passenger motor vehicle.

13. The drivetrain of claim 1, wherein at least one of the transmission and the planetary-type differential is in the form of a spur gearing.

14. The drivetrain of claim 1, wherein the at least one electric machine is arranged transversely with respect to a direction of travel of the motor vehicle.

15. The drivetrain of claim 1 wherein the drivetrain has an independent wheel suspension configuration and the axle sections have articulated shafts.

* * * * *